(12) United States Patent
Gottemoller et al.

(10) Patent No.: US 9,091,569 B2
(45) Date of Patent: Jul. 28, 2015

(54) OPACITY-BASED ROTARY POSITION SENSOR AND METHOD

(75) Inventors: Benjamin P Gottemoller, Peoria, IL (US); Isaac J Sachs, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1046 days.

(21) Appl. No.: 13/089,543

(22) Filed: Apr. 19, 2011

(65) Prior Publication Data

US 2012/0271457 A1   Oct. 25, 2012

(51) Int. Cl.
*G01D 5/34* (2006.01)
*G06M 7/00* (2006.01)
*H01J 40/14* (2006.01)
*G01D 5/347* (2006.01)

(52) U.S. Cl.
CPC .......... *G01D 5/3473* (2013.01); *G01D 5/34784* (2013.01)

(58) Field of Classification Search
CPC ............. G01D 5/347; G01D 5/34707; G01D 5/34715; G01D 5/34723; G01D 5/3473; G01D 5/34738; G01D 5/34746; G01D 5/34753; G01D 5/34761; G01D 5/34769; G01D 5/34776; G01D 5/34784; G01D 5/34792; G01D 5/353; G01D 5/35303; G01D 5/35306; G01D 5/2451
USPC .......... 250/221, 231.13–231.18; 33/1 R, 1 N, 33/1 M, 1 L, 1 SP, 1 PT; 356/138, 139, 356/139.03–139.09, 614–622; 359/436–442; 341/13, 14
See application file for complete search history.

(56) References Cited

U.S. PATENT DOCUMENTS

| | | | |
|---|---|---|---|
| 4,109,389 A | 8/1978 | Balcom et al. | |
| 4,654,522 A | 3/1987 | Gornick et al. | |
| 4,931,636 A | 6/1990 | Huggins | |
| 4,988,865 A | 1/1991 | Schmidt et al. | |
| 5,561,519 A | 10/1996 | Parker | |
| 5,596,189 A | 1/1997 | Orton | |
| 5,773,820 A | 6/1998 | Osajda et al. | |
| 5,903,000 A | 5/1999 | Juniman | |
| 6,396,052 B1 * | 5/2002 | Barry et al. | 250/231.13 |
| 6,410,910 B1 * | 6/2002 | Feichtinger | 250/231.13 |
| 7,060,969 B2 * | 6/2006 | Uchiyama et al. | 250/231.16 |
| 7,078,677 B2 | 7/2006 | Chong et al. | |
| 7,589,313 B2 * | 9/2009 | Nordenfelt et al. | 250/231.13 |
| 2003/0038232 A1 | 2/2003 | Blasing et al. | |
| 2008/0156973 A1 * | 7/2008 | Wong et al. | 250/231.16 |

FOREIGN PATENT DOCUMENTS

| | | | | |
|---|---|---|---|---|
| EP | 0635700 | 1/1995 | | |
| EP | 1544581 | 6/2005 | | |
| FR | 260337 | 3/1988 | | |
| JP | 61-093912 A | 5/1986 | | |
| JP | 61-093912 | * 12/1986 | ............... | G01D 5/30 |
| JP | 07140856 | 6/1995 | | |
| JP | 2007-033100 | * 8/2007 | ............. | G01D 5/347 |

* cited by examiner

*Primary Examiner* — Pascal M Bui Pho
(74) *Attorney, Agent, or Firm* — Baker Hostetler (57) ABSTRACT

A rotary position sensor includes a rotatable disk, a first light sensor configured to generate a first opacity signal, a second light sensor configured to generate a second opacity signal, and a comparator. The opacity of the rotatable disk is substantially unique at each radial angle value. The comparator is configured to generate a disk position signal as a function of the first opacity signal and the second opacity signal.

20 Claims, 5 Drawing Sheets

OPACITY-BASED ROTARY POSITION SENSOR AND METHOD

TECHNICAL FIELD

The present disclosure relates generally to a position sensor and a method to determine a position. Specifically, the present invention relates to a rotary disk position sensor and method to determine the position of a rotary device.

BACKGROUND

Determining the position of rotary devices in work machines both during operation and at start-up may enable better control of the devices. For example, knowing the position of a crankshaft in an engine, and thus top dead center in engine cylinders, may enable more effective engine controls. Some types of motors and generators, such as switched reluctance and permanent magnet, control the relationship of the rotor to stator fields. Knowing the position of the rotor is necessary to this type control. Knowing the speed of a rotor may also be necessary and/or desirable.

U.S. Pat. No. 5,773,820 to Osajda discloses a steering wheel shaft position sensor including a light emitter fixed with respect to the shaft and a pair of light detectors fixed with respect to the emitter. A disk is mounted for rotation on the shaft between the emitter and the detectors and has a grey scale track extending circumferentially on the disc between the emitter and one of the detectors. The grey scale varies from opaque to transparent to the light emitted by the emitter. A second, transparent track extends circumferentially on the disc between the emitter and the other detector. The outputs of the two detectors are compared to provide an indication of the movement of the shaft.

SUMMARY OF THE INVENTION

A rotary position sensor includes a rotatable disk, a first light sensor, a second light sensor, and a comparator. The opacity of the rotatable disk is substantially unique at each radial angle value. The first light sensor is located at a known first radial angle position and is operable to generate a first opacity signal indicative of the opacity of the disk. The second light sensor is located at a known second radial angle position and is operable to generate a second opacity signal indicative of the opacity of the disk. The second radial angle position is different than the first radial angle position. The comparator is configured to generate a disk position signal as a function of the first opacity signal and the second opacity signal.

A method of determining the position of a rotatable disk with substantially unique opacity for each radial angle includes sensing a first opacity of the disk at a known first radial angle position. The method also includes sensing a second opacity of the disk at a known second radial angle position, different from the first radial angle position. Additionally, the method includes determining a disk position as a function of the first opacity and the second opacity.

A work machine includes a rotary device, a rotatable disk, a first light sensor, a second light sensor, a third light sensor, and a controller. The rotatable disk and the rotary device are coupled to rotate in concert. The opacity of the disk is substantially unique for each radial angle. The first light sensor is located at a known first radial angle position and is operable to generate a first opacity signal indicative of disk opacity. The second light sensor is located at a known second radial angle position and is operable to generate a second opacity signal indicative of disk opacity. The second radial angle position is different than the first radial angle position. The third light sensor is located at a known third radial angle position and is operable to generate a third opacity signal indicative of disk opacity. The third radial angle position is different than the first radial angle position and the second radial angle position. The controller is configured to generate a rotary device position signal as a function of the first opacity signal, the second opacity signal, and the third opacity signal.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
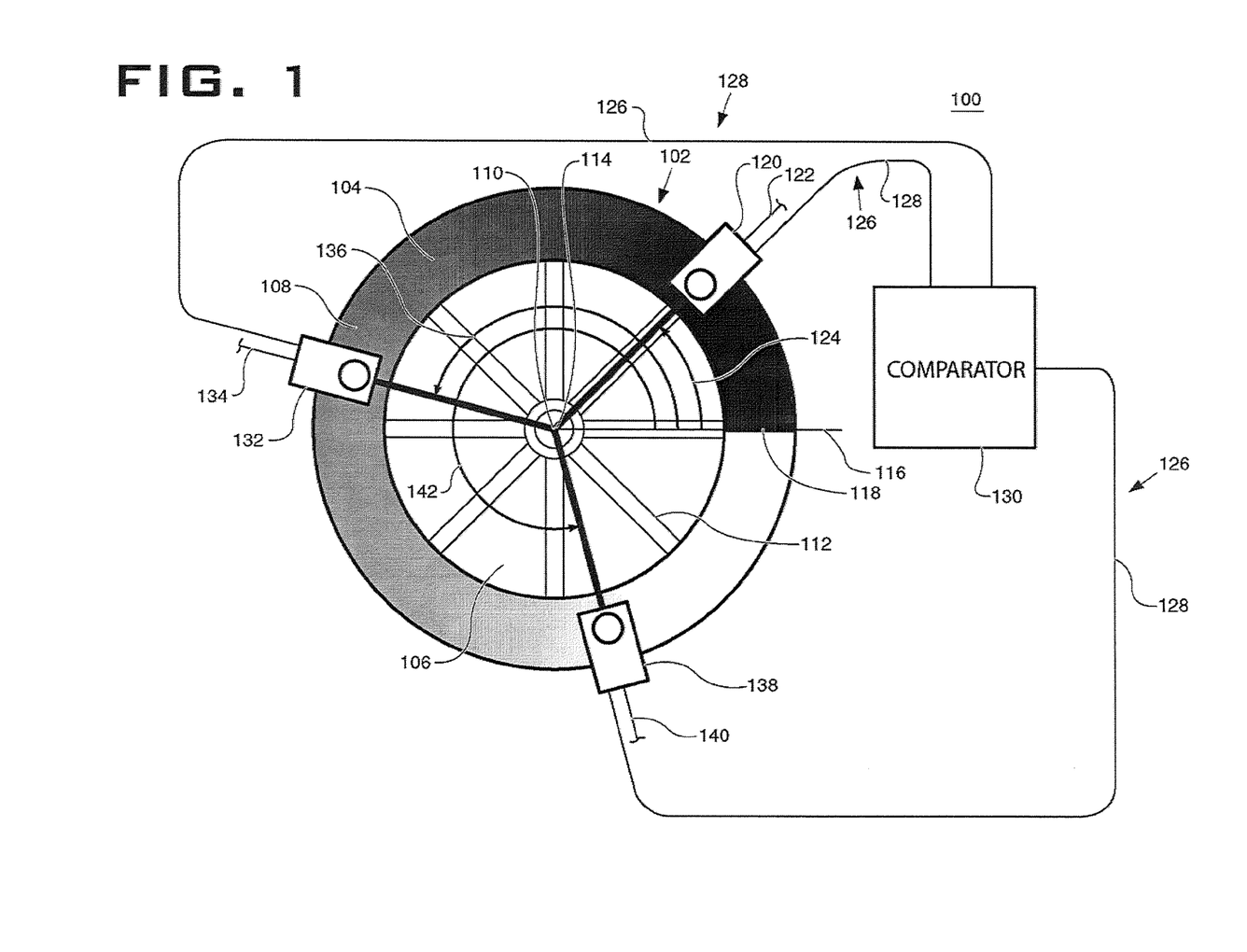
FIG. 1 is a schematic illustration of an exemplary embodiment of a rotary position sensor.

FIG. 1 illustrates an exemplary embodiment of a rotary position sensor 100. The position sensor 100 includes a rotatable disk 102, a first light sensor 120, a second light sensor 132, a third light sensor 138, and a comparator 130.

The disk 102 may include any thin, flat, circular plate or object that may rotate symmetrically about an axis substantially through the disk center 110 that would be known by an ordinary person skilled in the art now or in the future. In the embodiment depicted, the disk 102 includes a disk center 110, a body 104, an aperture 106, and spokes 112 radiating from the center 110.

The disk body 104 includes a varying opacity 108. Opacity 108 includes the relative capacity of body 104 to obstruct the transmission of light. The opacity 108 is substantially unique for each radial angle value of the disk body 104.

It will be obvious to an ordinary person skilled in the art that the material the body 104 is comprised of and the method of forming the opacity will dictate the measure of uniqueness. For example, if the body 104 is translucent and a dot matrix pattern is printed onto the body 104 to form the varying opacity 108, the uniqueness is limited by the size of the dots printed. In one embodiment with larger dots the uniqueness may be limited to every 0.5 degrees (0.5°). In another embodiment with smaller dots the uniqueness may be limited to 0.1 degrees (0.1°). In another example, if the body 104 material is varied to form the varying opacity, the uniqueness will be dependent on the materials and method used to form the body 104.

The body 104 may be comprised of any material that may include a varying opacity 108 that would be known by an ordinary person skilled in the art now or in the future. Non-limiting examples include acrylic and glass. A pattern may be printed onto the body 104 to create the varying opacity 108. Alternatively the varying opacity may be inherent in the material used to form the body 104. In another embodiment the body 104 may be a slim circular area on the rim of the disk of a translucent material varying in thickness. As the thickness increases, less light will penetrate the body 104. Various patterns that provide unique opacities at radial angles are known by ordinary persons skilled in the art. In one embodiment, the opacity 108 of the body 104 may vary linearly, that is the opacity at any given angle is the result of a linear equation of the angular position on the disk 102. In another embodiment, the opacity 108 may vary according to a different mathematical equation. In still another embodiment, the opacity 108 may vary according to a look-up table.

In the embodiment depicted, the disk 102 is keyed to a shaft 114. The shaft 114 extends through the disk center 110, substantially perpendicular to the disk 102. As the shaft 114 rotates, the disk 102 rotates. Other methods of rotating the disk 102 may be used and would be known by an ordinary person skilled in the art now or in the future.

In the depicted embodiment, spokes 112 extend from the disk center 110 to the body 104. In an alternative embodiment depicted in FIG. 2, the disk 102 includes a body 104 and an aperture 106. The body 104 is bolted onto a plate 222 and spacer 224. The plate 222 is statically coupled to the shaft 114. In another embodiment the aperture 106 is sized to key on the shaft 114 and the body 104 comprises the remainder of the disk 102. Other configurations of the disk 102 are contemplated and would be known by an ordinary person skilled in the art now or in the future.

The position sensor 100 is operable to sense the rotary position of the disk 102, by determining the rotary angle position of a disk reference vector 118, in relation to a position vector 116. The reference vector 118 may be any radius of the disk 102 that is chosen. If the disk opacity 108 is least at one radius and increases angularly for 360° (three hundred and sixty degrees), the line where the opacity 108 changes from the greatest to the least may be a good choice as depicted in the embodiment shown. One skilled in the art will realize that many choices can be made for the reference vector 118. A circumferential angle may be defined as an angle extending about the rotation axis of the rotatable disk 102 relative to a reference vector extending radially from the rotation axis. The terms "circumferential angle" and "radial angle" may be used synonymously herein.

The position vector 116 runs parallel to the general plane of the disk 102 and is static in relationship to the rotation of the disk 102. When the disk 102 is not rotating, the position vector 116 extends from an intersection with a line substantially perpendicular to the disk center 110, through an intersection with a line substantially perpendicular to a point on the edge of the disk 102. When the position vector 116 is parallel to the reference vector 118, the position of the disk may be said to be 0°. As the disk 102 rotates, the position of the disk 102 may be expressed by the value of the rotary angle between a projection of the position vector 116 onto the disk 102 and the reference vector 118. For example, if the disk 102 rotates a quarter turn from 0° position, it can be said to be at a position of 90°. Other expressions of the rotary angle relationship between the position vector 116 and the reference vector 118 may be used and would be known by an ordinary person skilled in the art now or in the future. Other reference relationships to determine and express the position of disk 102 are also known by ordinary persons skilled in the art and contemplated and may be used. For example, a simple dot may be a reference point.

The first light sensor 120 may include any device configured to produce a first opacity signal indicative of disk opacity 108 at a known first radial angle position 122 that would be known by an ordinary person skilled in the art now and in the future. In one embodiment the first light sensor 120 may include a light emitter and a light detector. The disk 102 may be coupled to the shaft 114 to rotate between the light emitter and the light detector. The light emitter may be positioned to emit light that radiates through the disk 102 to the light detector. The light detector may be configured to generate a signal indicative of the amount of light radiating through the disk 102. The amount of light radiating through the disk 102 may be indicative of the disk opacity 108. In one embodiment the light emitter includes a light emitting diode (LED) 228, and the light detector includes a photo-transistor 230.

In the embodiment depicted, the first light sensor 120 is located at a known first radial angle position 122. The known first radial angle position 122 is offset from the position vector 116 by a first offset 124. The first offset 124 may be an angular value. For example, in one embodiment the first light sensor 120 may be located at a known first radial angle position 122 offset from the position vector 116 by 60 degrees (60°). Disk 102 position may be calculated as a function of the first opacity signal indicative of disk opacity 108 at the known first radial angle position 122 and the first offset 124 as would be known by a ordinary person skilled in the art.

The first light sensor 120 is communicatively coupled to the comparator 130 through a connector 126. The first light sensor 120 may transmit the first opacity signal to the comparator 130 through the connector 126. In the embodiment depicted the connector 126 includes a wire 128. In other embodiments the connector 126 may include any means of transmitting the first opacity signal from the first light sensor 120 to the comparator 130 that would be known to an ordinary person skilled in the art now or in the future.

For the purposes of this application, communicatively coupled includes any system or method of being joined, fastened, or connected in such a manner that a device or machine is able to communicate with and/or transfer data with another device or machine. Such systems or methods may include mechanical connections, fluid connections, pneumatic connections, electronics, magnetics, optics, radio, cellular, and/or sound techniques as well as others not expressly described herein. Communicatively coupled is not intended to be limited to a mechanical or hard-wired form of communication or date transfer.

The second light sensor 132 may include any device configured to produce a second opacity signal indicative of the disk opacity 108 at a known second radial angle position 134 that would be known by an ordinary person skilled in the art now and in the future. In one embodiment the second light sensor 132 may include a light emitter and a light detector. The disk 102 may be coupled to the shaft 114 to rotate between the light emitter and the light detector. The light emitter may be positioned to emit light that radiates through the disk 102 to the light detector. The light detector may be configured to generate a signal indicative of the amount of light radiating through the disk 102. The amount of light radiating through the disk 102 may be indicative of the disk opacity 108. In one embodiment the light emitter includes a light emitting diode (LED) 228, and the light detector includes a photo-transistor 230.

In the embodiment depicted, the second light sensor 132 is located at a known second radial angle position 134. The second radial angle position 134 is offset from the position vector 116 by a second offset 136. The second offset 136 is an angular value. For example, in one embodiment the second light sensor 132 may be located at a known second radial angle position 134 offset from the position vector 116 by 180 degrees (180°). Disk 102 position may be calculated as a function of the second opacity signal indicative of disk opacity 108 at the known second radial angle position 134 and the second offset 136 as would be known by a ordinary person skilled in the art.

The second light sensor 132 is communicatively coupled to the comparator 130 through a connector 126. The second light sensor 132 may transmit the second opacity signal to the comparator 130 through the connector 126. In the embodiment depicted the connector 126 includes a wire 128. In other embodiments the connector 126 may include any means of transmitting the second opacity signal from the second light sensor 132 to the comparator 130 that would be known to an ordinary person skilled in the art now or in the future.

The third light sensor 138 may include any device configured to produce a third opacity signal indicative of the disk opacity 108 at a known third radial angle position 140 that would be known by an ordinary person skilled in the art now and in the future. In one embodiment the third light sensor 138 may include a light emitter and a light detector. The disk 102 may be coupled to the shaft 114 to rotate between the light emitter and the light detector. The light emitter may be positioned to emit light that radiates through the disk 102 to the light detector. The light detector may be configured to generate a signal indicative of the amount of light radiating through the disk 102. The amount of light radiating through the disk 102 may be indicative of the disk opacity 108. In one embodiment the light emitter includes a light emitting diode (LED) 228, and the light detector includes a photo-transistor 230.

In the embodiment depicted, the third light sensor 138 is located at a known third radial angle position 140. The third radial angle position 140 is offset from the position vector 116 by a third offset 142. The third offset 142 is an angular value. For example, in one embodiment the third light sensor 138 may be located at a known third radial angle position 140 offset from the position vector 116 by 300 degrees (300°). Disk 102 position may be calculated as a function of the third opacity signal indicative of disk opacity 108 at the known third radial angle position 140 and the second offset 136 as would be known by a ordinary person skilled in the art.

The third light sensor 138 is communicatively coupled to the comparator 130 through a connector 126. The third light sensor 138 may transmit the third opacity signal to the comparator 130 through the connector 126. In the embodiment depicted the connector 126 includes a wire 128. In other embodiments the connector 126 may include any means of transmitting the third opacity signal from the third light sensor 138 to the comparator 130 that would be known to an ordinary person skilled in the art now or in the future.

The comparator 130 may include any device or means to compare the first opacity signal, the second opacity signal, and the third opacity signal with each other, a low limit value, and/or a high limit value, and generate a disk position signal that would be known to an ordinary person skilled in the art now or in the future. The comparator 130 may generate the disk position signal in line with methods described in relation to FIGS. 3, 4A and/or 4B. The comparator 130 may include an analogue device, a digital device, or a combination of both. The comparator 130 may include a control module with a memory device and a processor.

Figure 2:
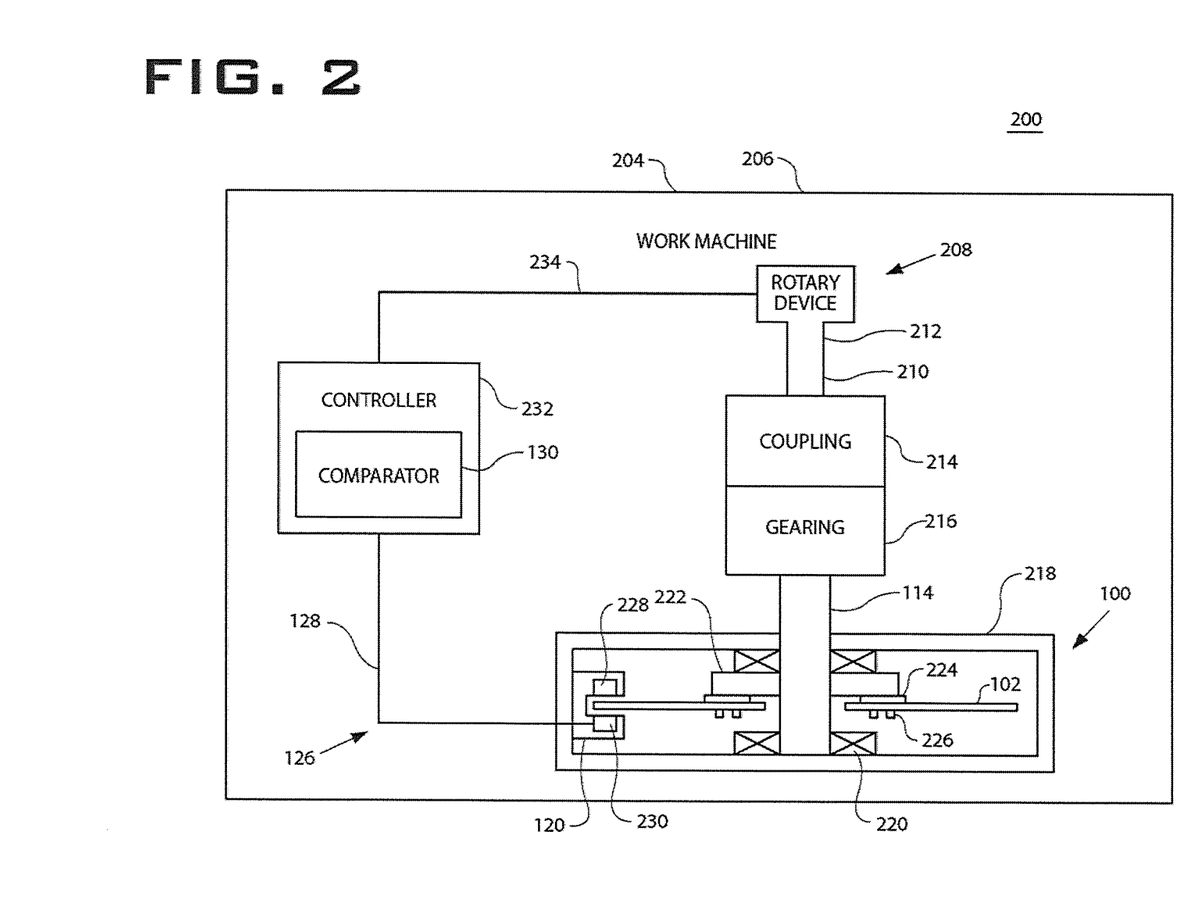
FIG. 2 is a schematic illustration of an exemplary embodiment of a work machine.

Referring now to FIG. 2, a work machine 200 is depicted. The embodiment of the work machine 200 depicted includes a rotary device 208, coupling 214, gearing 216, a rotary position sensor 100, a controller 232, and a communication link 234. The work machine 200 includes devices and circuitry to determine the position of the rotary device 208 and may control the rotary device 208 or another element, device, system, or apparatus as a function of the position of the rotary device 208.

The work machine 200 may include any system or device for doing work including a rotary device 208. The work machine 200 may include a mobile machine or a stationary machine. Mobile machines may include but are not limited to machines that transport passengers, goods, and apparatus. For example, mobile machines may include any type of automobile or commercial vehicle. Non-limiting examples of mobile machines include on-highway vehicles, commercial machines such as trucks, cranes, earthmoving vehicles, mining vehicles, backhoes, loaders, material handling equipment, farming equipment, marine vessels, aircraft, and any type of movable machine. Stationary machines may include any fixed device or system which does work and/or assists in a human task. Non-limiting examples of stationary machines include engines, motors, electric generator sets, printing machines, copying machines, facsimile machines, manufacturing equipment, compressors, pumps, and drilling equipment.

In one embodiment, the work machine 200 includes an internal combustion engine 206. In this embodiment the rotary device 208 includes a crankshaft 212. When the engine 206 is started, knowing the position of the crankshaft 212 and thus the piston position in cylinders may assist in better operating the engine.

In another embodiment, the work machine 200 includes an electric motor 204. In this embodiment the rotary device 208 includes a rotor 210. When starting the electric motor it may be desirable to know the position of the rotor to better operate the motor.

The rotary device 208 is coupled to the disk 102 in such a way that they rotate in concert. For purposes of this application, rotating in concert includes rotating in unison such that the rotational or angular velocity of the disk 102 is equal to the rotational or angular velocity of the rotary device 208 multiplied by an integer. In one embodiment the rotary disk 102 and the rotary device 208 are coupled such that the angular velocity of the disk 102 equals the angular velocity of the rotary device 208. This embodiment may include a shaft 114 to which both the rotary device 208 and disk 102 are fixedly attached such that both the rotary device 208 and the disk 102 rotate in concert with the shaft 114.

The coupling 214 which couples the rotary device 208 to the disk 102 may include any device which links or connects the rotary device 208 to the disk 102. Coupling 214 may include plates, shafts, belts, gears, or any other device, or system of devices which couple the rotary device 208 to the disk 102 such that they rotate in concert which would be known by an ordinary person skilled in the art now or in the future. In some embodiments, gearing 216 may be used to couple the rotary device 208 to the disk 102. The gearing 216 may include any system of gears or other parts for transmitting motion which would be known by an ordinary person skilled in the art now or in the future.

When operating in a work environment, the disk 102 and light sensors 120, 132, 138 may need protection from heat, dust, and/or other contaminants which may affect the accuracy of the position sensor 100. In the embodiment depicted in FIG. 2, the work machine includes a housing 218 which may protect the disk 102, light sensors 120, 132, 138, and other circuitry and elements from contaminants and/or heat.

In the depicted embodiment, the disk 102 is fixedly coupled to the shaft 114 through a plate 222, and a spacer 224, with bolts 226. The disk 102 rotates with the shaft 114. The shaft 114 is supported through bearings 220. The plate 222 is fixedly coupled to the shaft 114. The shaft 114 is coupled to the rotary device 108 through coupling 214 and gearing 216 in such a way as to rotate in concert with the rotary device 108.

Other methods of coupling the disk 102 to the shaft 114 to rotate in concert with the rotary device 208 will be apparent to ordinary persons skilled in the art now or in the future.

In the depicted embodiment light sensors 120, 132, 138 include LED 228 and photo-transistor 230. LED 228 radiates light as is known in the art. Depending on the disk opacity 108 at the radial location of the photo-transistor 230, a portion of the light from the LED 228 will be measured by the photo-transistor 230. The photo-transistor 230 is operable to generate a signal indicative of disk opacity 108. The photo-transistor 230 is communicatively coupled to the controller 232 through connector 126. In the depicted embodiment the connector 126 includes a wire or wires 128 which transmits one or more opacity analogue signals from photo-transistor 230 to a controller 232 input(s). In alternative embodiments connector 126 may include, but is not limited to, a digital data-link with either hard wire or wireless connections with photo-transistor 230 and controller 232.

In the embodiment depicted, the controller 232 is configured to receive opacity signals from the light sensors 120, 132, 138 indicative of a disk 102 position and a rotary device 208 position. The controller 232 is communicatively coupled to the rotary device 208 to transmit control signals to the rotary device 208 as a function of the position of the rotary device 208. In other embodiments, the controller 232 may be communicatively coupled to another element, device, system, or apparatus in such a manner as to transmit control signals to the other element, device, system, or apparatus as a function of the position of the rotary device 208.

The controller 232 may include a processor (not shown) and a memory component (not shown). The processor may be a microprocessor or other processor as known in the art.

The processor may execute instructions and generate a rotary device position signal as a function of the first opacity signal, the second opacity signal, and the third opacity signal; as described below in connection with FIGS. 3, 4A, and/or 4B.

Such instructions may be read into or incorporated into a computer readable medium, such as the memory component or provided external to processor. In alternative embodiments, hard-wired circuitry may be used in place of or in combination with software instructions to implement a method of determining the position of a disk, and/or a method of determining the position of a rotary device. Thus embodiments are not limited to any specific combination of hardware circuitry and software. In one embodiment the controller 232 includes a comparator 130.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and may in some embodiments take the form of receivers and/or transmitters of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, and EPROM, a FLASH-EPROM, any other memory chip or cartridge, or any other medium from which a computer or processor can read.

The memory component may include any form or combination of forms of computer-readable media as described above. In the illustrated embodiment, the memory component is located on-board the work machine 200. In an alternative embodiment, the memory component may be located remotely. In still another alternative embodiment, the memory component may include several types of computer readable media some located on-board and some located remotely.

The processor and the memory component may be contained in one or more units. The controller 232 is not limited to electronic and electrical circuitry and software. In other embodiments the controller 232 may include hydraulic circuits, pneumatic circuits, mechanical control devices, or a combination of these and electronic and electrical circuitry and software may implement a control method.

Industrial Applicability

Figure 3:
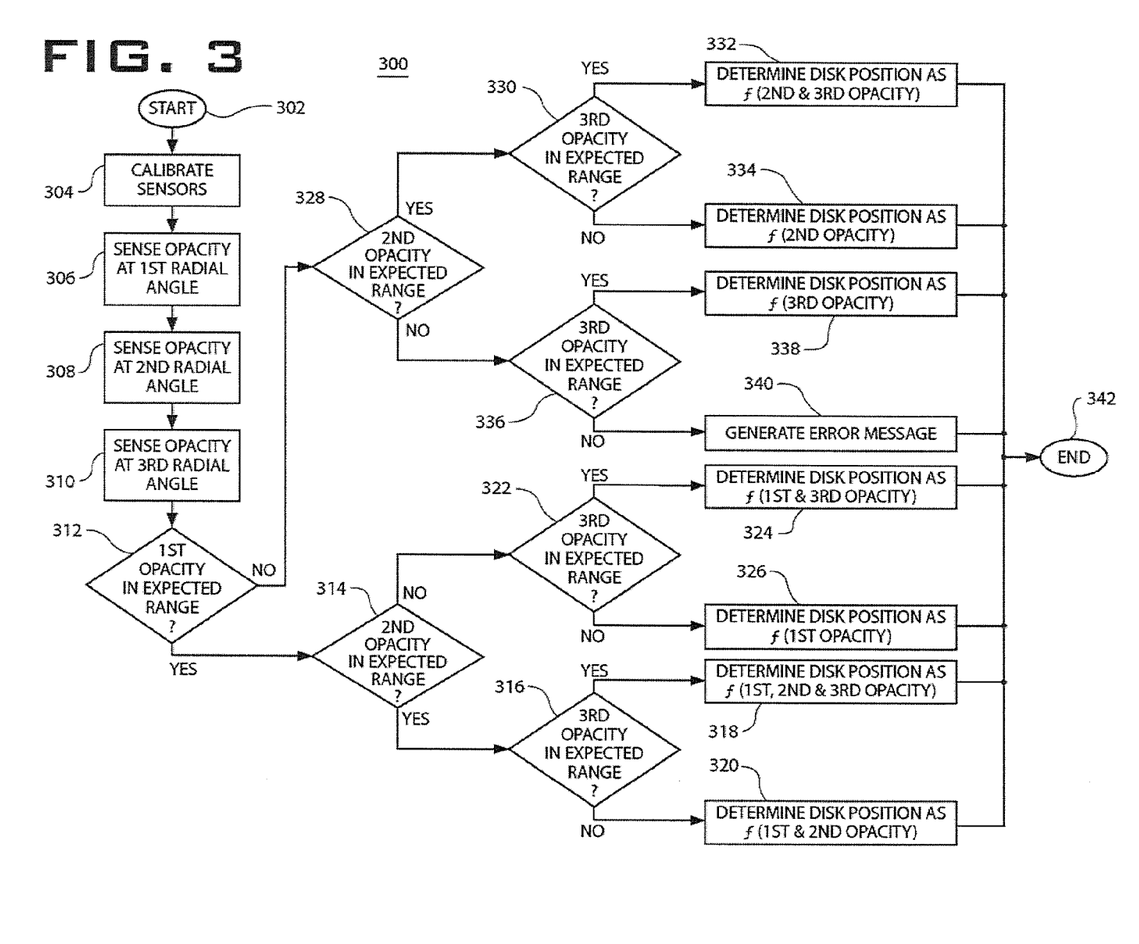
FIG. 3 is a flow chart of an exemplary rotatable disk position method.

Referring now to FIG. 3, a method 300 of determining the position of a rotatable disk 102 with substantially unique opacity 108 for each radial angle is depicted. The method includes sensing a first opacity of the disk 102 at a known first radial angle position 122 (step 306); sensing a second opacity of the disk 102 at a known second radial angle position 134, different from the first radial angle position 122 (step 308); and determining a disk 102 position as a function of the first opacity and the second opacity (steps 332, 334, 338, 340, 324, 326, 318, 320). The method 300 starts at 302.

The light sensors 120, 132, 138 are configured to generate opacity signals. In one embodiment, the light sensors 120, 132, 138 may be capable of generating voltage signals in a range of 0V to 5V. The light sensors 120, 132, 138 may be configured such that generating a valid opacity signal, includes generating an opacity signal is in the general range of 1V to 4V.

When there is a large change in disk opacity at a radial angle, an erroneous signal may be generated by a light sensor 120, 132, 138. For example, if the disk opacity 108 gradually increases from a particular radial angle for 360 degrees (360°), so that there is a dividing line between the least opacity and the greatest opacity, the signal may tend to be erroneous when trying to sense opacity at the dividing line. In one embodiment the erroneous signal may be less than the low limit of the general range, or higher than the high limit of the general range.

Although the light sensors 120, 132, 138 may be configured to generate signals in a general range of 1V to 4V, manufacturing tolerances and other irregularities may cause a slightly different range for each sensor 120, 132, 138. When the position sensor 100 is first operated, the controller may calibrate the sensors to the range of 1V to 4V (step 304). For example, one sensor 120, 132, 138 may actually generate opacity signals in the range from 1.2V to 4.1V. The controller may calibrate this such that a 1.2V signal is set to 1.0, and a 4.1V signal is set to 4V. Any signal in between is scaled accordingly. Scaling signals is known by ordinary persons skilled in the art. By scaling the opacity signals, each scaled opacity signal will be in the same range. The scaling may be done by any method known by ordinary persons skilled in the art now or in the future.

The first light sensor 120 generates a first opacity signal indicative of disk opacity 108 at the first radial angle position 122 (step 306). The second light sensor 132 generates a second opacity signal indicative of disk opacity 108 at the second radial angle position 134 (step 308). The third light sensor 138 generates a third opacity signal indicative of disk opacity 108 at the third radial angle position 140 (step 310). The opacity signals are read per the calibration created in step 304.

The opacity signals are compared with the general range of values expected. For example, if the general range expected is 1V to 4V, the opacity signals are compared with the range. If an opacity signal is below the low limit (in the example the low limit equals 1V) or above the high limit (in the example the high limit equals 4V), then that opacity signal is not used to determine the position of the disk 102 and/or the rotary device 208. Instead, the controller 232 determines disk 102 position and/or rotary device 208 position as a function of the opacity signals in the expected range. For example, the controller 232 may average the disk 102 position indicated by the opacity signals in the expected range. If all the opacity signals are out of the expected range, the controller 232 may generate an error signal.

An exemplary method of determining disk 102 and/or rotary device 208 position through eliminating opacity signals out of the expected range from the calculations is depicted in FIG. 3.

At step 312, the controller 232 determines if the first opacity signal is in the expected range. If the first opacity signal is in the expected range, the method continues to step 314. If the first opacity signal is not in the expected range, the method continues to step 328.

At step 314, the controller 232 determines if the second opacity signal is in the expected range. If the second opacity signal is in the expected range, the method continues to step 316. If the second opacity signal is not in the expected range, the method continues to step 322.

At step 316, the controller 232 determines if the third opacity signal is in the expected range. If the third opacity signal is in the expected range, the method continues to step 318. If the third opacity signal is not in the expected range, the method continues to step 320.

At step 318, the controller 232 determines the disk 102 position as a function of the first opacity signal, the second opacity signal, and the third opacity signal.

At step 320, the controller 232 determines the disk 102 position as a function of the first opacity signal and the second opacity signal.

At step 328 (gone to if the first opacity signal is not in the expected range), the controller 232 determines if the second opacity signal is in the expected range. If the second opacity signal is in the expected range, the method continues to step 330. If the second opacity signal is not in the expected range, the method continues to step 336.

At step 330, the controller determines if the third opacity signal is in the expected range. If the third opacity signal is in the expected range, the method continues to step 332. If the third opacity signal is not in the expected range, the method continues to step 334.

At step 332, the controller 232 determines the disk 102 position as a function of the second opacity signal and the third opacity signal.

At step 334, the controller 232 determines the disk 102 position as a function of the second opacity signal.

At step 336 (gone to if the first opacity signal and the second opacity signal are not in the expected range), the controller 232 determines if the third opacity signal is in the expected range. If the third opacity signal is in the expected range, the method continues to step 338. If the third opacity signal is not in the expected range, the method continues to step 340.

At step 338, the controller 232 determines the disk 102 position as a function of the third opacity signal.

At step 334, the controller 232 generates an error message signal.

At step 322 (gone to if the first opacity signal is in the expected range, and the second opacity signal is not in the expected range), the controller 232 determines if the third opacity signal is in the expected range. If the third opacity signal is in the expected range, the method continues to step 324. If the third opacity signal is not in the expected range, the method continues to step 326.

At step 324, the controller 232 determines the disk 102 position as a function of the first opacity signal and the third opacity signal.

At step 326, the controller 232 determines the disk 102 position as a function of the first opacity signal.

At step 318 (gone to if the first opacity signal is in the expected range, the second opacity signal is in the expected range, and the third opacity signal is not in the expected range), the controller 232 determines the disk 102 position as a function of the first opacity signal and the second opacity signal.

Figure 4A:
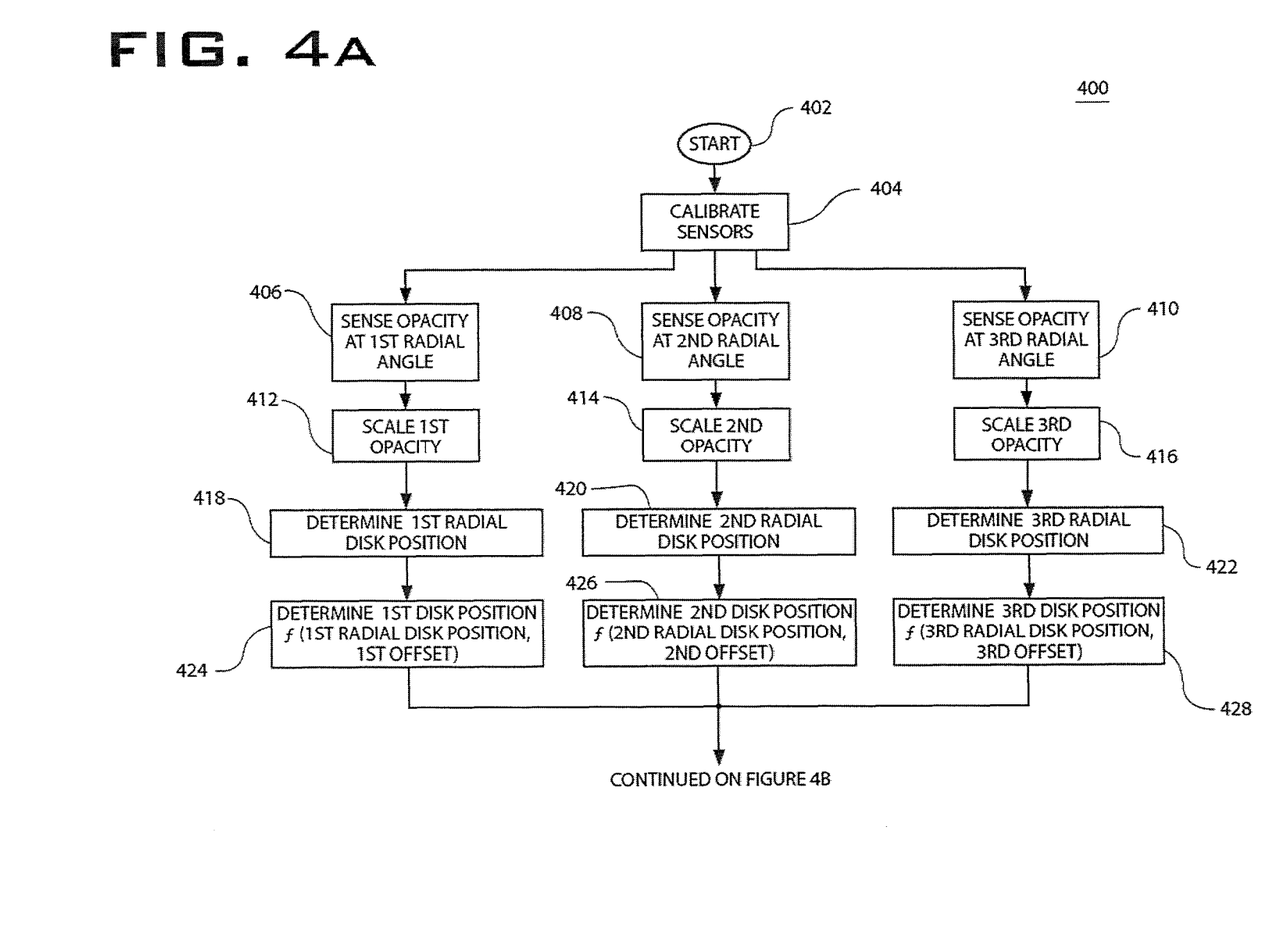
FIG. 4A is a flow chart of an exemplary rotary device position method.
Figure 4B:
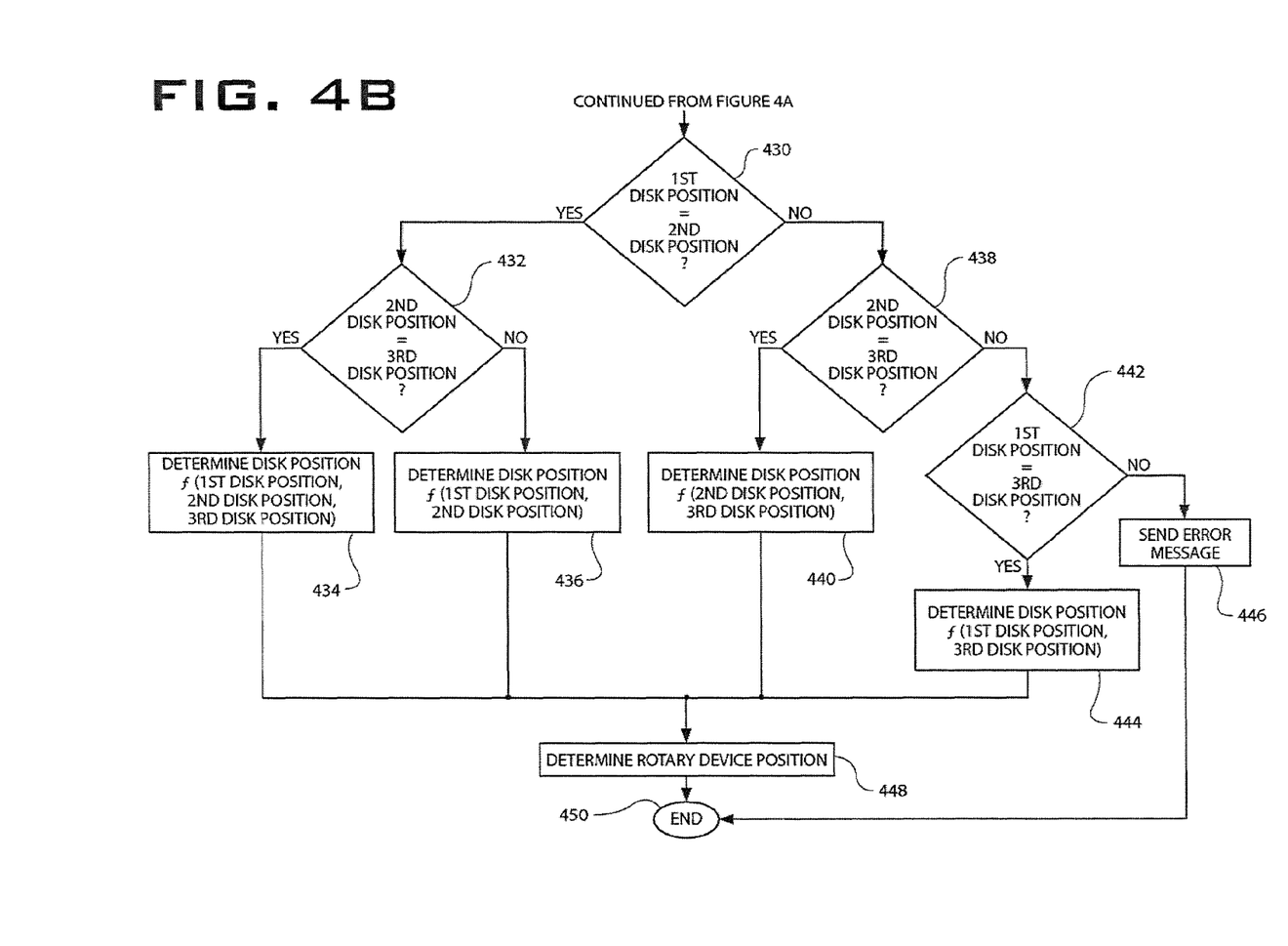
FIG. 4B is a continuation of the flow chart in FIG. 4A.

Referring now to FIGS. 4A and 4B, a method 400 of determining the position of a rotatable disk 102 with substantially unique opacity 108 for each radial angle is depicted. The method includes sensing a first opacity of the disk 102 at a known first radial angle position 122 (step 406); sensing a second opacity of the disk 102 at a known second radial angle position 134, different from the first radial angle position 122 (step 408); sensing a third opacity of the disk 102 at a known third radial angle position 140, different from the first radial angle position 122 and the second radial angle position 134 (step 410); and determining a disk 102 position as a function of the first opacity, the second opacity, and the third opacity (steps 434, 436, 440, 444). The method 400 starts at 402.

The controller 232 may calibrate the light sensors 120, 132, 138 (step 404). The first light sensor 120 generates a first opacity signal indicative of disk opacity 108 at the first radial angle position 122 (step 406). The second light sensor 132 generates a second opacity signal indicative of disk opacity 108 at the second radial angle position 134 (step 408). The third light sensor 138 generates a third opacity signal indicative of disk opacity 108 at the third radial angle position 140 (step 410). The opacity signals are read per the calibration created in step 304.

In some embodiments, it may be desirable to scale the calibrated opacity signals before determining disk 102 position and/or rotary device 208 position. For example, the opacity signals may be scaled to a value greater than or equal to 0 and less than or equal to 1. This scaling may be done by any method and to any scale that would be known by an ordinary person skilled in the art now or in the future (steps 412, 414, 416).

The controller 232 may determine the disk 102 positions indicated by each opacity sensor. For example, the controller 232 may determine a first radial disk position from the first opacity signal. The first radial disk position may be the position of the disk 102 if the first radial angle position was in the same position as the position vector (step 418). The controller 232 may then determine a first disk position as a function of the first radial angle position and the first offset (step 424). The first disk position may be the disk 102 position indicated by the first opacity signal.

Likewise, the controller 232 may determine a second radial disk position from the second opacity signal. The second radial disk position may be the position of the disk 102 if the second radial angle position was in the same position as the position vector (step 420). The controller 232 may then determine a second disk position as a function of the second radial angle position and the second offset (step 426). The second disk position may be the disk 102 position indicated by the second opacity signal.

Additionally, the controller 232 may determine a third radial disk position from the third opacity signal. The third radial disk position may be the position of the disk 102 if the third radial angle position was in the same position as the position vector (step 422). The controller 232 may then determine a third disk position as a function of the third radial angle position and the third offset (step 428). The third disk position may be the disk 102 position indicated by the third opacity signal.

The controller 232 may determine the disk 102 position and/or the rotary device 208 position through a voting method. In the voting method, the controller 232 may compare the first disk position, the second disk position, and the third position. If one of the disk positions does not substantially equal the other two disk positions, the controller 232 may disregard it and determine the disk 102 position and/or the rotary device 208 position as a function of the other two disk positions.

An exemplary method of determining disk 102 and/or rotary device 208 position through eliminating disk position signals by voting is depicted in FIGS. 4A and 4B. Any voting method that would be known by an ordinary person skilled in the art now or in the future to determine disk 102 position and/or rotary device 208 position.

In step 430 the controller 232 compares the first disk position and the second disk position. If the first disk position substantially equals the second disk position, the method proceeds to step 432. If the first disk position does not substantially equal the second disk position the method proceeds to step 438. For the purpose of this description, a first value substantially equals a second value if the first value is no more or less than the second value than could be explained by normal tolerances and errors within a system or device as would be known by an ordinary person skilled in the art now or in the future.

In step 432 the controller 232 compares the second disk position and the third disk position. If the second disk position substantially equals the third disk position, the method proceeds to step 434. If the first disk position does not substantially equal the second disk position the method proceeds to step 436.

In step 434 the controller 232 determines the disk 102 position as a function of the first disk position, the second disk position, and the third disk position.

In step 436 the controller 232 determines the disk 102 position as a function of the first disk position and the second disk position.

In step 438 (gone to if the first disk position does not substantially equal the second disk position), the controller 232 compares the second disk position and the third disk position. If the second disk position substantially equals the third disk position, the method proceeds to step 440. If the first disk position does not substantially equal the second disk position the method proceeds to step 442.

In step 440 the controller 232 determines the disk 102 position as a function of the second disk position and the third disk position.

In step 442 (gone to if the first disk position does not substantially equal the second disk position, and the second disk position does not substantially equal the third disk position), the controller 232 compares the first disk position and the third disk position. If the first disk position substantially equals the third disk position, the method proceeds to step 444. If the first disk position does not substantially equal the third disk position the method proceeds to step 446.

In step 444 the controller 232 determines the disk 102 position as a function of the first disk position and the third disk position.

In step 446 (gone to if the first disk position does not substantially equal the second disk position, the second disk position does not substantially equal the third disk position, and the first disk position does not substantially equal the third disk position), the controller 232 generates an error message signal. The method then proceeds to step 450 which ends the method.

When the controller 232 determines a disk 102 position (steps 434, 436, 440, 444), the method proceeds to step 448. In step 448, the controller 232 determines a rotary device 208 position as a function of the disk 102 position.

The rotary device 208 is coupled to the rotatable disk 102 in a known manner during manufacture. The controller 232 memory includes an indication of the relationship between positions on the disk 102 and rotary device 208. The indication may be in a look-up table, a map, an algorithm, or any other method which would be known by an ordinary person skilled in the art now or in the future.

The method proceeds from step 448 to step 450 and ends.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A rotary position sensor, comprising:
a rotatable disk defining three or more points arranged in a circumferential array about the rotatable disk, each point of the three or more points being disposed at a unique circumferential angle about the rotatable disk, the rotatable disk having a unique opacity at each point of the three or more points, each unique circumferential angle extending about a rotation axis of the rotatable disk relative to a reference vector extending radially from the rotation axis;
a first light sensor located at a first circumferential angle position and being operable to generate a first opacity signal indicative of an opacity of the rotatable disk at the first circumferential angle position, the first light sensor including a light emitter and a light detector, the light detector of the first light sensor being arranged to receive light emitted by the light emitter of the first light sensor and transmitted through the rotatable disk;
a second light sensor located at a second circumferential angle position and being operable to generate a second opacity signal indicative of an opacity of the rotatable disk at the second circumferential angle position, the second circumferential angle position being different from the first circumferential angle position, the second light sensor including a light emitter and a light detector, the light detector of the second light sensor being arranged to receive light emitted by the light emitter of the second light sensor and transmitted through the rotatable disk; and a comparator configured to generate a disk position signal as a function of the first opacity signal and the second opacity signal, wherein the comparator is further configured to generate the disk position signal
as a function of the second opacity signal if the first opacity signal is one of less than a low limit value and more than a high limit value,
as a function of the first opacity signal if the second opacity signal is one of less than the low limit value and more than the high limit value, and
as a function of an average of the first opacity signal and the second opacity signal if the first opacity signal and the second opacity signal are in a range between the low limit value and the high limit value.

2. The position sensor of claim 1, wherein the opacity of the rotatable disk at the three or more points varies in a substantially linear relationship with respective circumferential angle positions of the three or more points.

3. The position sensor of claim 1, further comprising:
a third light sensor located at a known third circumferential angle position and being operable to generate a third opacity signal indicative of an opacity of the rotatable disk at the third circumferential angle position, the third circumferential angle position being different from the first circumferential angle position and the second circumferential angle position,
wherein the comparator is further configured to generate the disk position signal as a function of the first opacity signal, the second opacity signal, and the third opacity signal.

4. The position sensor of claim 3, wherein the comparator is further configured to generate the disk position signal:
as a function of an average of a first disk position indicated by the first opacity signal and a second disk position indicated by the second opacity signal if
the first disk position substantially equals the second disk position, and
a third disk position indicated by the third opacity signal is substantially different from the first disk position and the second disk position,
as a function of an average of the second disk position and the third disk position if the second disk position substantially equals the third disk position, and the first disk position is substantially different from the second disk position and the third disk position, and
as a function of an average of the first disk position and the third disk position if the first disk position substantially equals the third disk position, and the second disk position is substantially different from the first disk position and the third disk position.

5. The position sensor of claim 4, wherein the comparator is further configured to generate a disk absolute position signal as a function of an average of the first disk position, the second disk position, and the third disk position if the first disk position, the second disk position, and the third disk position are substantially equal.

6. The position sensor of claim 3, wherein the comparator is further configured to generate a disk position signal as a function of a first offset, a second offset, and a third offset.

7. The position sensor of claim 3, wherein the comparator is further configured to generate a disk position signal as a function of calibrating and scaling the first opacity signal, the second opacity signal, and the third opacity signal to a scale ranging from zero to one.

8. The position sensor of claim 3, wherein the first opacity signal, the second opacity signal, and the third opacity signal are analogue signals.

9. The rotary position sensor of claim 1, further comprising a controller operatively coupled to the first light sensor and the secod light sensor, the controller including the comparator.

10. A method for determining a position of a rotatable disk defining three or more points arranged in a circumferential array about the rotatable disk, each point of the three or more points being disposed at a unique circumferential angle about the rotatable disk, the rotatable disk having a unique opacity at each point of the three or more points, each unique circumferential angle extending about a rotation axis of the rotatable disk relative to a reference vector extending radially from the rotation axis, the method comprising:
sensing a first opacity of the rotatable disk at a first circumferential angle position based on a first transmission of light through the rotatable disk from a first light emitter to a first light detector;
sensing a second opacity of the rotatable disk at a second circumferential angle position based on a second transmission of light through the rotatable disk from a second light emitter to a second light detector, the second circumferential angle position being different from the first circumferential angle position;
determining a disk position as a function of the first opacity of the rotatable disk and the second opacity of the rotatable disk;
determining if the first opacity is one of less than a low limit value and more than a high limit value;
determining if the second opacity is one of less than the low limit value and more than the high limit value;
determining a disk absolute position as a function of the second opacity if the first opacity is one of less than the low limit value and more than the high limit value;
determining the disk absolute position as a function of the first opacity if the second opacity is one of less than the low limit value and more than the high limit value; and
determining the disk absolute position as a function of the first opacity and the second opacity if the first opacity and the second opacity are in a range between the low limit value to the high limit value.

11. The method of claim 10, further comprising:
sensing a third opacity of the rotatable disk at a third circumferential angle position different from the first circumferential angle position and the second circumferential angle position; and
determining the disk position at least in part as a function of the third opacity.

12. The method of claim 11, further comprising:
determining a first disk position as a substantially linear function of the first opacity;
determining a second disk position as a substantially linear function of the second opacity;
determining a third disk position as a substantially linear function of the third opacity; and
determining the disk position as a function of the first disk position, the second disk position, and the third disk position.

13. The method of claim 11, further comprising:
determining a first disk position as a function of a first offset;
determining a second disk position as a function of a second offset;
determining a third disk position as a function of a third offset; and determining the disk position as a function of the first disk position, the second disk position, and the third disk position.

14. The method of claim 11, further comprising:

determining a first disk position as a function of the first opacity;

determining a second disk position as a function of the second opacity;

determining a third disk position as a function of the third opacity; and determining the disk position as a function of an average of the first disk position and the second disk position, if the first disk position is substantially the same as the second disk position, and the third disk position is substantially different from the first disk position and the second disk position;

determining the disk position as a function of an average of the second disk position and the third disk position, if the second disk position is substantially the same as the third disk position, and the first disk position is substantially different from the second disk position and the third disk position;

determining the disk position as a function of an average of the first disk position and the third disk position, if the first disk position is substantially the same as the third disk position, and the second disk position is substantially different from the first disk position and the third disk position; and determining the disk position as a function of an average of the first disk position, the second disk position, and the third disk position, if the first disk position, the second disk position, and the third disk position are substantially the same.

15. A machine, comprising:

a rotary device;

a rotatable disk coupled to the rotary device to rotate in concert with the rotary device, the rotatable disk defining three or more points arranged in a circumferential array about the rotatable disk, each point of the three or more points being disposed at a unique circumferential angle about the rotatable disk, the rotatable disk having a unique opacity at each point of the three or more points, each unique circumferential angle extending about a rotation axis of the rotatable disk relative to a reference vector extending radially from the rotation axis;

a first light sensor located at a first circumferential angle position and being operable to generate a first opacity signal indicative of an opacity of the rotatable disk at the first circumferential angle position, the first light sensor including a light emitter and a light detector, the rotatable disk being disposed between the light emitter of the first light sensor and the light detector of the first light sensor, the light detector of the first light sensor being arranged to receive light emitted by the light emitter of the first light sensor and transmitted through the rotatable disk;

a second light sensor located at a second circumferential angle position and being operable to generate a second opacity signal indicative of an opacity of the rotatable disk at the second circumferential angle position, the second circumferential angle position being different from the first circumferential angle position, the second light sensor including a light emitter and a light detector, the rotatable disk being disposed between the light emitter of the second light sensor and the light detector of the second light sensor, the light detector of the second light sensor being arranged to receive light emitted by the light emitter of the second light sensor and transmitted through the rotatable disk; and a controller configured to generate a rotary device position signal as a function of the first opacity signal and the second opacity signal, and generate the rotary device position signal
as a function of the second opacity signal if the first opacity signal is one of less than a low limit value and more than a high limit value,
as a function of the first opacity signal if the second opacity signal is one of less than the low limit value and more than the high limit value, and
as a function of an average of the first opacity signal and the second opacity signal if the first opacity signal and the second opacity signal are in a range between the low limit value and the high limit value.

16. The machine of claim 15, further comprising a third light sensor located at a third circumferential angle position and being operable to generate a third opacity signal indicative of an opacity of the rotatable disk at the third circumferential angle position, the third circumferential angle position being different from the first circumferential angle position and the second circumferential angle position, wherein the controller is further configured to generate the rotary device position signal as a function of the first opacity signal, the second opacity signal, and the third opacity signal.

17. The machine of claim 16, further comprising a shaft coupled to the rotary device and the rotatable disk.

18. The machine of claim 16, further comprising an electric motor having a rotor, the rotor coupled to the rotatable disk to rotate in concert with the rotatable disk.

19. The machine of claim 16, further comprising an internal combustion engine having a crankshaft, the crankshaft coupled to the rotatable disk to rotate in concert with the rotatable disk.

20. The machine of claim 16, further comprising a housing, the housing enclosing the rotatable disk, the first light sensor, the second light sensor, and the third light sensor.

* * * * *